Reissued Mar. 1, 1932

Re. 18,370

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

UREA RESIN PRODUCT AND PROCESS OF MAKING SAME

No Drawing. Original No. 1,685,355, dated September 25, 1928, Serial No. 745,937, filed October 25, 1924. Application for reissue filed December 4, 1929. Serial No. 411,702.

This invention relates to various molded or shaped products and sheeted material or plate of novel appearance and to the process of making same.

In a co-pending application, Serial No. 742,719, filed October 9, 1924, I have described the formation of striated molded articles by pressing together resin-impregnated multi-colored fragments of paper. In the present invention one object is to secure striated products, the striations of which are of a more regular or uniform character than obtained by the process set forth in said application. Also in some cases, I desire to obtain banded effects or parallel striation including the peculiar striped effect employed in imitating ivory. Further objects include the production of hot pressed or molded urea resin products substantially free from discoloration.

In carrying out my invention for example I impregnate paper or other tissue, which preferably should be unsized, employing as the impregnating medium a resin, preferably a synthetic resin, having the property of hardening or setting in the mold when hot pressed at elevated temperatures. Phenol formaldehyde resins may be employed in some cases for this operation especially for darker colors but generally speaking I prefer a light colored base in which the striations appear and the phenol formaldehyde resins are therefore not suitable for use in this way because of discoloration by light.

A satisfactory resin for the purpose is however made by treatment of urea with formaldehyde. Such material may be obtained in its initial stage of conversion in the form of an aqueous syrup with which the paper may be impregnated. The urea formaldehyde resin may be used by itself or it may be incorporated with other resins to secure a fluxing effect. One resin which is satisfactory for this purpose is that obtained by reacting on acetone with formaldehyde in the presence of an alkaline catalyst. A mixture of say one part of the acetone formaldehyde resin to three or four parts of the urea formaldehyde resin may be employed to advantage.

The tissue employed may be ordinary tissue paper or parchment paper, or heavily calendered imitation parchment paper known as glassine paper. Heavier forms of paper such as thin blotting paper may be employed in some cases, also muslin or other thin cloth. Generally speaking I prefer to obtain a translucent product and the employment of heavy paper which cannot be thoroughly impregnated to obtain translucency is objectionable for the purpose. The paper may be dyed different colors or the resin solution may be employed with different dyes or pigments or both the paper and the resin solution may be colored. Sheets of one color are piled one on another until the requisite thickness of that color is secured and then other sheets of a different color are piled thereon. In this way there may be built up a press-board of any desired thickness. This is exposed to a pressure of 2000 pounds per square inch in a press at 125° C. for a period of 10 minutes or more depending on the thickness of the press-board. After cooling in a cold press, a laminated product having differently colored strata is obtained. The pressboard is then sawed or cut transversely into small strips and these are placed together edgewise in the mold and re-pressed. In this way the position of the stripes or strata is reversed and the surface of the pressed article now shows striations in parallel bands extending across its surface and through to the opposite side.

This method may be continued, the article obtained by the second pressing being again cut and pressed or folded and pressed to obtain still more striking effects.

The strips referred to above before pressing may be dipped in a solution of the urea formaldehyde syrup employed for impregnation (with or without acetone formaldehyde resin) in order to cause the surfaces of the strips to better adhere on the second pressing.

Since in the first pressing, which preferably may take place at 110–125° C., a slight amount of setting may occur, it is desirable to carry out the second pressing at a somewhat higher temperature, say 130° C. However if discoloration occurs at that temperature a longer period at a lower temperature may be employed.

The banded sheets thus obtained are striking of appearance due to the fact that the striations or bands formed by the dark colored paper shows a vigorous contrast alongside of the uncolored paper and the latter, if the pressboard is not too thick, are translucent yielding a product useful for various ornamental purposes such as lamp shades and the like. Instead of pressing in the form of a sheet the material may be molded into various shapes such as receptacles of various kinds, handles and various ornamental articles.

Further by having the striations narrow and of a light brown tone alternating with broader bands of the color of ivory an effect quite similar to ivory may be obtained.

A description of the method of making the urea formaldehyde resin intermediate syrup and the acetone formaldehyde resin and their incorporation follows.

*Example 1—Urea resin syrup.*—30 parts of urea are dissolved in 120 parts of aqueous formaldehyde and 3 parts of phthalic anhydride are added to the solution. The mixture is then slowly and gradually heated, the temperature being around 80–90° C., in a flask connected with an air condenser or a water-cooled reflux condenser. The heating is continued until the contents of the flask become clear and water white. The syrup so obtained is then cooled and stored. This syrup usually contains from 45 to 55 per cent of solids. It can be diluted with water to a 25 or 30 per cent solution without any danger of precipitation.

*Example 2—Composite product.*—75 parts of urea are dissolved in 325 parts of aqueous formaldehyde and to this 25 parts of molten phenol and 10 parts of phthalic anhydride are added. The mixture is then very gradually brought to slight boiling and is maintained at this point until the milky solution which is first formed gradually becomes clear and water white. Extensive boiling as well as sharp raising of the temperature should be avoided in order to prevent the possibility of coagulation of the syrup. To the clear syrup so obtained while still warm a small amount (2 or 3 per cent) of alcohol is added. This prevents the syrup from turning milky on cooling.

*Example 3—Acetone resin solution.*—30 parts of acetone are mixed with 225 parts of aqueous 40 per cent formaldehyde in a large round bottom flask. 26 grams of 50 per cent aqueous solution of pure sodium hydroxide are then added and the flask is allowed to stand in the cold. In a short time an energetic exothermic reaction is taking place and a slightly yellowish gummy resin separates on the bottom. The reaction is checked at this point by adding a large amount of cold water in order to obtain an alcohol soluble resin. The water layer is then decanted and the resin is washed with water free from caustic and finally is dissolved in an amount of alcohol so as to form a 30 per cent solution.

The method of preparing the mixed complex solution is as follows:

(A) A 50 per cent solution of either syrup #1 or composite resin #2 is mixed with an equal weight of 30 per cent alcoholic solution of acetone resin #3 and the mixture used for impregnation.

(B) The same 50 per cent urea syrup #1 could be mixed with 30 per cent solution of other light colored products soluble either in water or alcohol, as for example a glycerol tartrate, citrate or phthalate.

Impregnation of paper may be carried out simply by soaking, or passing the paper through a bath of the solution. Or pressure and vacuum methods, known to the impregnation art, may be employed in some cases.

What I claim is:

1. A process of making a streak-ribbed sheet material or plastic product which comprises impregnating sheets of thin paper with a synthetic resin comprising urea resin, superposing sheets of different colors, hot-pressing to weld the sheets together to a thicker sheet or block, cutting such pressed material transversely to make thin strips, assembling the strips edgewise in a hot press and pressing to weld the strips together to form a streak-ribbed or variegated partially translucent product.

2. A process of making a streak-ribbed sheet material or plastic product which comprises impregnating sheets of paper with a synthetic resin comprising urea resin, superposing sheets of different colors, hot-pressing to weld the sheets together to a thicker sheet or block, cutting such pressed material transversely to make strips, assembling the strips edgewise in a hot press and pressing to weld the strips together to form a streak-ribbed or variegated partially translucent product.

3. A process of making a streak-ribbed sheet material or plastic product which comprises impregnating sheets of thin paper with a synthetic resin, superposing sheets of different colors, hot-pressing to weld the sheets together to a thicker sheet or block, cutting such pressed material transversely to make thin strips, assembling the strips edgewise in a hot press and pressing to weld the strips together to form a streak-ribbed or variegated partially translucent product.

4. A process of making a streak-ribbed sheet material or plastic product which comprises impregnating sheets of paper with synthetic resin comprising urea and acetone resins, superposing sheets of different colors, hot-pressing to weld the sheets together to a thicker sheet or block, cutting such pressed material transversely to make strips, assembling the strips edgewise in a hot press and pressing to weld the strips together to form a streak-ribbed or variegated partially translucent product.

5. A process of making a streak-ribbed sheet material or plastic product which comprises impregnating sheets of thin paper of different colors with a synthetic resin comprising urea resin, superposing such sheets of different colors, hot-pressing to weld the sheets together to a thicker sheet or block, cutting such pressed material transversely to make thin strips, assembling the strips edgewise in a hot press and pressing to weld the strips together to form a streak-ribbed or variegated partially translucent product.

6. A process of making a streak-ribbed sheet material or plastic product which comprises impregnating sheets of paper with synthetic resins of different colors, superposing the resulting sheets of different colors, hot-pressing to weld the sheets together to a thicker sheet or block, cutting such pressed material transversely to make strips, assembling the strips edgewise in a hot press and pressing to weld the strips together to form a streak-ribbed or variegated partially translucent product.

7. A process of making a streak-ribbed sheet material or plastic product which comprises impregnating sheets of paper of different colors with synthetic resins of different colors, superposing such sheets of different colors, hot pressing to weld the sheets together to a thicker sheet or block, cutting such pressed material transversely to make thin strips, assembling the strips edgewise in a hot press and pressing to weld the strips together to form a streak-ribbed or variegated partially translucent product.

8. A process of making a streak-ribbed sheet material or plastic product which comprises impregnating sheets of paper with a synthetic resin comprising urea resin, superposing sheets of different colors, hot pressing to weld the sheets together, cutting such pressed material transversely to make strips, assembling the strips edgewise, and hot pressing to weld the strips together at a temperature higher than that used in the first hot pressing step.

9. Streak-ribbed translucent pressboard containing urea resin.

10. Streak-ribbed translucent pressboard containing urea and acetone resin.

11. In a process of making a molded material, the steps which comprise impregnating cellulosic material with a synthetic resin comprising urea resin, and hot pressing at a temperature above 110° C. and below that at which discoloration takes place in the product.

12. In a process of making a streak-ribbed product, the steps which comprise impregnating sheets of paper of different colors with a synthetic resin comprising urea resin, superposing sheets of different colors, hot pressing at a temperature above 110° C. and below that at which discoloration takes place in the product.

13. A process of making a streak-ribbed product which comprises impregnating sheets of paper with synthetic resin comprising urea resins of different colors, superposing sheets of different colors, hot pressing at a temperature above 110° C. and below that at which discoloration takes place, cutting such pressed material transversely to make strips, assembling the strips, and hot pressing the assembled strips at a temperature higher than that used in the first hot pressing step.

14. In the process of making molded urea resin articles, the step of hot pressing a urea resin material at a temperature above 110° C. and below that at which substantial discoloration takes place in the product.

15. In the process of making molded urea resin articles, the step of hot pressing a urea-formaldehyde resin material at a temperature above 110° C. and below that at which substantial discoloration takes place in the product.

CARLETON ELLIS.